(12) United States Patent  (10) Patent No.: US 6,604,292 B1
Irish et al.  (45) Date of Patent: Aug. 12, 2003

(54) VEHICLE POSITIONING

(75) Inventors: Ray Irish, Coventry (GB); Marc Singleton, Northants (GB)

(73) Assignee: SPX Corporation, Muskegon, MI (US)

( * ) Notice: Subject to any disclaimer, the term of this patent is extended or adjusted under 35 U.S.C. 154(b) by 0 days.

(21) Appl. No.: 09/516,437

(22) Filed: Mar. 1, 2000

(30) Foreign Application Priority Data

Mar. 2, 1999 (GB) .............................................. 9904653

(51) Int. Cl.[7] .................................................. G01B 5/25
(52) U.S. Cl. ............................. 33/288; 33/203; 33/608
(58) Field of Search ....................... 33/288, 203, 203.12, 33/203.15, 203.18, 600, 608

(56) References Cited

U.S. PATENT DOCUMENTS

| 3,188,741 A | | 6/1965 | Jeansson et al. ............... 33/138 |
| 4,958,439 A | | 9/1990 | Dehn ........................... 33/608 |
| 5,179,784 A | * | 1/1993 | Kowis ........................ 33/203.18 |
| 5,507,101 A | | 4/1996 | Mason ......................... 33/608 |
| 6,105,264 A | * | 8/2000 | Phillips ...................... 33/288 |
| 6,181,993 B1 | * | 1/2001 | Dale, Jr. et al. .............. 33/288 |
| 6,219,134 B1 | * | 4/2001 | Voeller et al. ............ 33/203.12 |
| 6,226,879 B1 | * | 5/2001 | Baird ...................... 33/203.18 |

FOREIGN PATENT DOCUMENTS

| EP | 0 855 574 | 7/1988 |
| FR | 2 508 625 | 12/1982 |
| GB | 2 237 644 | 5/1991 |

* cited by examiner

*Primary Examiner*—Diego Gutierrez
*Assistant Examiner*—Yaritza Guadalupe
(74) *Attorney, Agent, or Firm*—Baker & Hostetler LLP

(57) ABSTRACT

Apparatuses and methods for determining the position of a part on a vehicle are provided. The methods comprise measuring the respective distances from first and second measuring locations to each of a plurality of measuring points associated with the part whose position is to be determined. The position of each of the measuring points is then calculated relative to a fixed location, and these values are compared to determine the position of the part. The inventive apparatus comprises a main body which is attached to the vehicle. The main body includes an elongate member extending substantially therefrom and mounted to pivot relative to the main body about a pivot point central to the location of attachment of the main body to the vehicle. Finally, the main body comprises a retractable wire which can be extended to droppers removably fixed to the vehicle at various pick-up points. A sensing unit determines the distance from the main body to the pick-up point from the length of wire extended.

17 Claims, 7 Drawing Sheets

VEHICLE POSITIONING

BACKGROUND OF THE INVENTION

1. Field of the Invention

The present invention relates to vehicle positioning and particularly, but not exclusively, to a method of determining the position of a part of a vehicle.

2. Description of the Prior Art

It is important that certain parts of a vehicle, for example drive components such as axles, drive shafts and engine cross members on which the engine may be mounted, are correctly positioned with respect to one another and are correctly aligned. Failure to ensure this can result in abnormal driving characteristics for the vehicle and/or excessive wear on the drive parts.

When a vehicle is initially assembled, the various parts are positioned and aligned by means of a jig assembly in a manner which is well known in the art. During the vehicle's useful lifetime, however, it may be necessary for some of its parts to be removed, adjusted or replaced. It is essential that when the parts are refitted, they are correctly positioned and aligned with respect to one another.

Heretofore, it has been necessary to position and align replaced parts by means of a jig assembly, which is both expensive and time consuming. The present invention seeks to provide an improved method and apparatus for determining the position of a part of a vehicle.

SUMMARY OF THE INVENTION

According to one aspect of the present invention there is provided a method of determining the position of a part of a vehicle, the method comprising:

measuring the distance from a first measuring location to each of a plurality of measuring points associated with said part;

measuring the distance from a second measuring location to each of said measuring points;

calculating the position of each of said measuring points relative to a fixed location; and comparing the position of each of said measuring points relative to said fixed location so as to determine the position of said part in said vehicle.

Preferably, the step of calculating includes calculating the position of a datum line relative to which the position of the part is to be determined.

The step of calculating may further include calculating the position of the intersection between the datum line and a line joining a respective measuring point and the datum line and which is perpendicular thereto.

The step of comparing may include comparing the positional distance along the datum line of the intersections with the datum line of two or more lines extending between the datum line and measuring points associated with a common part.

Conveniently, if the positional distances are the same, the part is deemed to be perpendicular to the datum line.

According to another aspect of the present invention there is provided measuring apparatus for locating a position on a vehicle, the apparatus comprising:

a main body having attachment means at one end thereof for attaching said body to said vehicle;

an elongate member extending substantially from said main body and universally pivotably mounted to pivot relative to the main body about a pivot point at a central point of the attachment means;

fixing means for releasably fixing the position of the elongate member relative to the main body; and a measuring position located at a predetermined position along the elongate member;

wherein the apparatus is arranged such that, in use, the measuring position lies vertically below said central point.

Preferably, the elongate member is pivotably mounted by means of a wire attached at one end to the member and at the other end to said central point.

The measuring position may comprise a groove or other means in said elongate member for engagement with a part of an associated measuring unit.

The apparatus may further comprise checking means mounted on said elongate member for checking the verticality thereof.

The checking means may comprise a spherical spirit level, or an electronic levelling device, preferably mounted for axial rotation about said elongate member.

BRIEF DESCRIPTION OF THE DRAWINGS

The present invention will now be described, by way of example only, with reference to the accompanying drawings in which:

FIG. 3 is a schematic diagram of a preferred form of measuring apparatus in accordance with the present invention;

FIG. 4 is a schematic diagram of an alternative form of measuring apparatus;

DETAIL DESCRIPTION OF THE PREFERRED EMBODIMENTS

Figure 1:
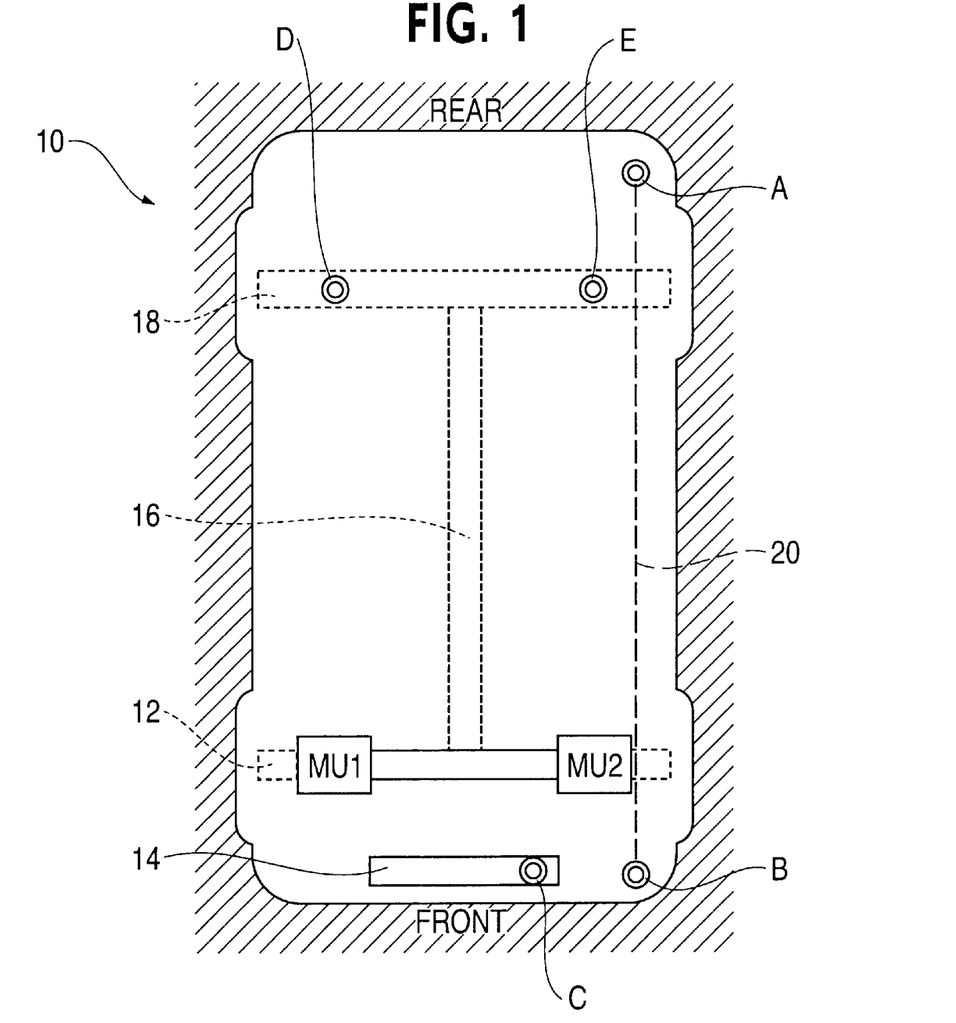
FIG. 1 is a schematic plan view showing the relative positions of pick-up points on a vehicle.

Referring to FIG. 1, a vehicle 10 has parts whose position is to be checked. In this embodiment, the vehicle is a four-wheel vehicle with rear-wheel drive.

The vehicle 10 has a front-mounted engine mounted on two laterally extending, substantially parallel cross members 12, 14. A drive shaft 16, which transmits drive from the engine to a rear wheel drive assembly 18, extends rearwardly from the engine and substantially perpendicularly to the engine cross members 12, 14. In practice, the rear wheel drive assembly 18 may comprise a rear wheel differential and two opposing prop-shafts (not shown) connected between the differential and a respective rear wheel. Such an arrangement is conventional in a rear wheel drive vehicle.

During factory assembly of the vehicle, a jig is used to position the parts of the vehicle by means of measuring points, known as "pick-up" points, on or associated with those parts. The jig has a number of positioning locators corresponding to the pick-up points of the vehicle parts and the parts are positioned by aligning the pick-up points with the positioning locators on the jig. The vehicle body is located on the jig by using two datum pick-up points on the body. The datum pick-up points are usually located on the left side of the body, one at the front and one at the rear. When located, the engine, transmission and drive units are bolted to the body. However, certain tolerances are incorporated into the positioning of the vehicle parts during factory assembly such that the absolute positions of each of the parts for a specific vehicle are not known. It is the pick-up points, therefore, which are generally defined by holes or bores in the respective part, that provide the means of reference for positioning the parts once the vehicle has left the factory.

In order to determine the position of the parts of a vehicle, distance measurements are taken between certain measuring locations MU1/MU2, and pick-up points A–E on or associated with the parts of the vehicle. The positions of measuring location MU1 and MU2 and pick-up points C–E are calculated relative to a datum line 20 defined by pick-up points A and B which constitute the know datum pick-up points which are used in the positioning of the vehicle parts during factory assembly.

Figure 2:
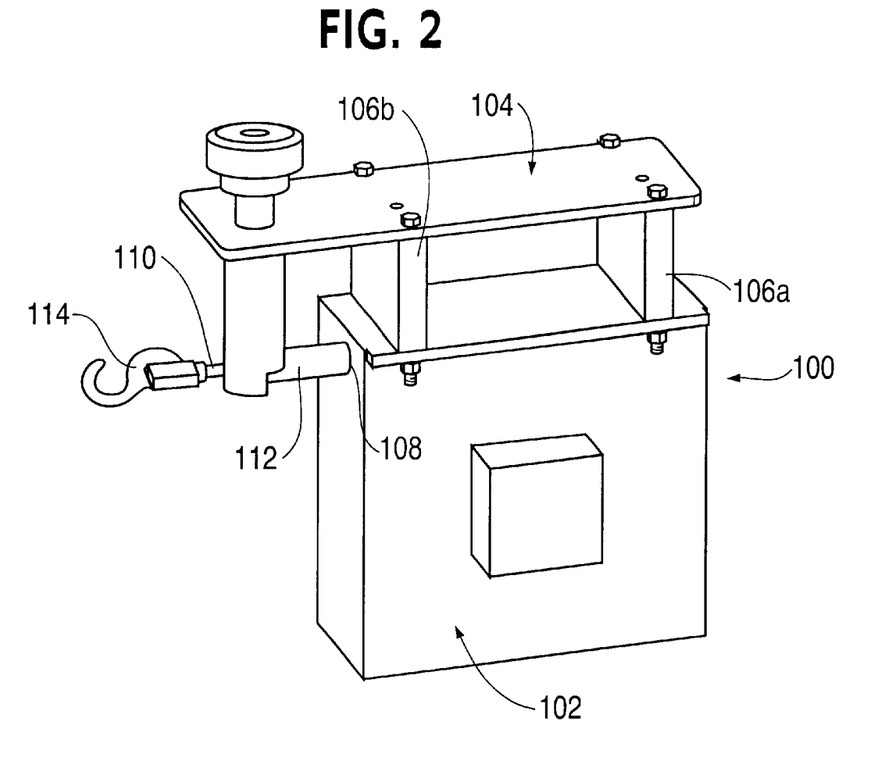
FIG. 2 is a perspective view of a preferred form of measuring unit according to the present invention.

The distance measurements between measurement locations MU1/MU2 and pick-up points A–E are taken using a measuring unit, a preferred form of which is shown in FIG. 2. The measuring unit 100 has a main body 102, in the form of a substantially rectangular box, rigidly connected to a mounting plate 104 by means of supports 106a, 106b. The mounting plate has an aperture at one end thereof through which a bolt or the like can be passed to enable the mounting plate to be rigidly mounted on a vehicle part, in this case a vehicle cross member.

The main body 102 has an aperture 108 in one side thereof from which extends a flexible measuring wire 110. A sleeve 112 extending substantially perpendicularly from the main body 102 surrounds the wire 110 along a portion of its length nearest the aperture 108. A measuring hook 114, the purpose of which is described below, is secured to the end of the wire. The measuring wire 110 is wound round a rotatable spool (not shown) within the main body 102 such that it can be unwound and extended through the aperture by pulling on the wire. The spool is spring mounted to retract the wire back onto the spool when the wire is released. The measuring unit 100 also includes a sensing unit (not shown) which senses the length of the wire unwound from the spool, and provides a calibrated reading corresponding to that length.

Figure 3A:
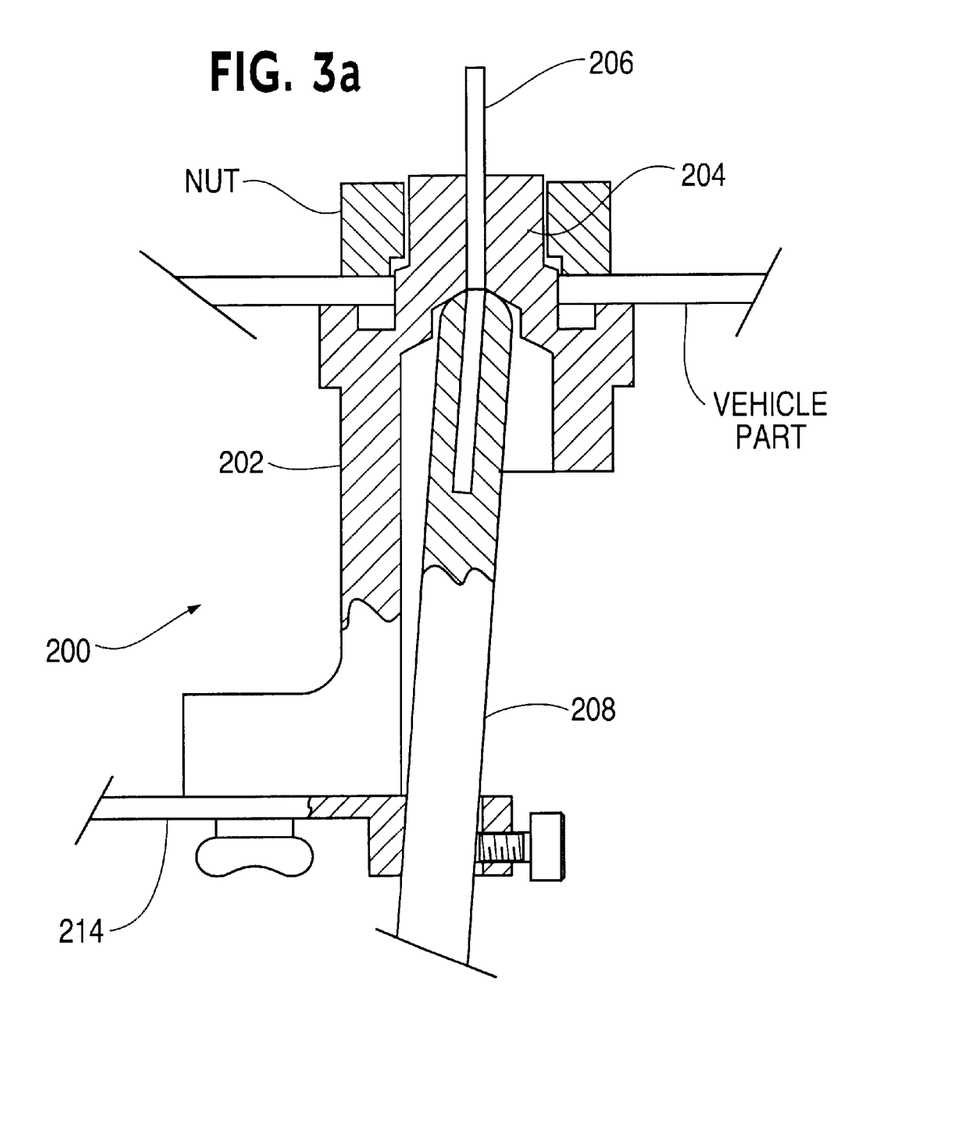
FIG. 3a is a cross-sectional view of the measuring apparatus of FIG. 3 mounted to a vehicle part.

It is essential that the measurements are made to the centre of the pick-up points. If this is not accurately achieved, errors will occur in the calculations. In order to achieve this, vertical locators in the form of droppers are provided which are accurately mounted in the bores of the pick-up points A–E on the various parts. Each dropper 200, a preferred form of which is shown in FIG. 3 includes a main body 202, preferably of cylindrical form, having a mounting means in the form of an axially extending thread 204 at an upper end thereof. The thread 204 is adapted to be inserted through the bore of the respective pick-up point A–E in the part such that it can be accurately located in the centre of the pick-up point bore and rigidly held in position on the part by means of a nut (FIG. 3a).

Alternatively, other types of mounting means may be used such as that shown in FIG. 4. For example, it may not be possible to mount the dropper to the respective part by means of the thread and nut because of access problems to both sides of the part. In this case, magnets or other mechanical means may be used to accurately clamp the dropper to the part.

A flexible wire wick 206 extends axially through the centre of the thread and the main body. One end 206a of the wick 206 is securely fastened to an upper end of the thread 204, while the other end 206b is secured to an elongate member in the form of a measuring rod 208 which extends vertically downwards from within the main body 202. The wire wick acts as a universal hinge for the measuring shaft such that the shaft is free to pivot in two dimensions within the confines of the main body.

One function of the wick 206 is to enable the measurement of the centre of the pick-up point to be made by transferring the exact centre of the pick-up point bore vertically down to a convenient measuring position, as is described below.

At the lower end of the measuring rod 208, there is provided checking means in the form of a spherical spirit level 210. The spirit level is fixed to a bracket 212 which is mounted on the measuring rod 208 such that it can rotate about the axis of the rod and may be used for checking the orientation of the rod. Fixing means 214 are also provided to fix the measuring rod in a position relative to the main body.

The rod 208 also includes measuring position in the form of a groove 216 located at a predetermined point on the rod, the purpose of which is described below.

A dropper 200 is positioned at each of the pick-up points A–E on the vehicle using the thread. Although the main body 202 of each dropper 200 may be mounted generally at right angles to the respective part, the wire wick 206 connected to the measuring rod 208 allows the rod to hang vertically downwards and be accurately positioned by means of the spirit level and fixed in position by the fixing means.

It can be seen therefore that the combination of the wire wick and the measuring rod act as a plumbline to the centre of the hole at the pick-up point. The groove 216 of the measuring rod therefore always hangs vertically below the centre of the pick-up point hole (unless the cross member is at a great enough inclination to prevent the measuring rod from hanging vertically downwards owing to contact with the main body). The fixing means 214 can be used to fix the rod in its vertical orientation so that it is not disturbed during the measuring process and the spherical spirit level 210 can be rotated about the measuring rod to ensure that the rod has not been moved from the vertical, for example by use of the fixing means.

The measuring unit 100 is rigidly mounted by its mounting plate 104 to the first engine cross member 12 at measuring location MU1 by means of a nut and bolt or the like and is then used to measure the distance between the measuring location MU1 and each of the pick-up points A–E. The wire 110 is extended from the measuring unit 100 and attached to a first one of the droppers by means of the hook 114 engaging the groove 216 on the measuring rod.

It is preferable that the groove on each rod is at the same height relative to the measuring unit. Small variations in height are allowable owing to the large horizontal distances involved but it is preferable that the vehicle is not tilted about a lateral axis by more than approximately 1 degrees from the horizontal or about a longitudinal axis by more than approximately 0.2 degrees from the horizontal since this will affect the accuracy of the measurements.

The sensor within the measuring unit generates a signal corresponding to the length of wire extended from the spool and transmits the signal to a data processor, usually in the form of a computer. The process is then repeated for the remaining droppers and each measurement is sent to the computer.

The measuring unit 100 is then detached from measuring location MU1 and repositioned at measuring location MU2 on the first engine cross member 12, and is used to measure the distance between the measuring location MU2 and each of the pick-up points A–E. Each of the readings is then fed to the computer.

Once the two sets of five measurements have been taken and fed to the computer, the computer calculates various angles between the geometrical lines joining the measuring locations MU1, MU2 and the pickup-up points A–E (FIG. 4). As the computer calculates the angles, it uses the values to calculate certain distances not directly measurable by the measuring unit. The computer may include software which compensates for any variation in pick-up point height owing to, for example, vehicle tilt.

The calculation of these distances enables the computer to determine the position of each pick-up point and whether their positions are in accordance with predetermined parameters.

Figure 5:
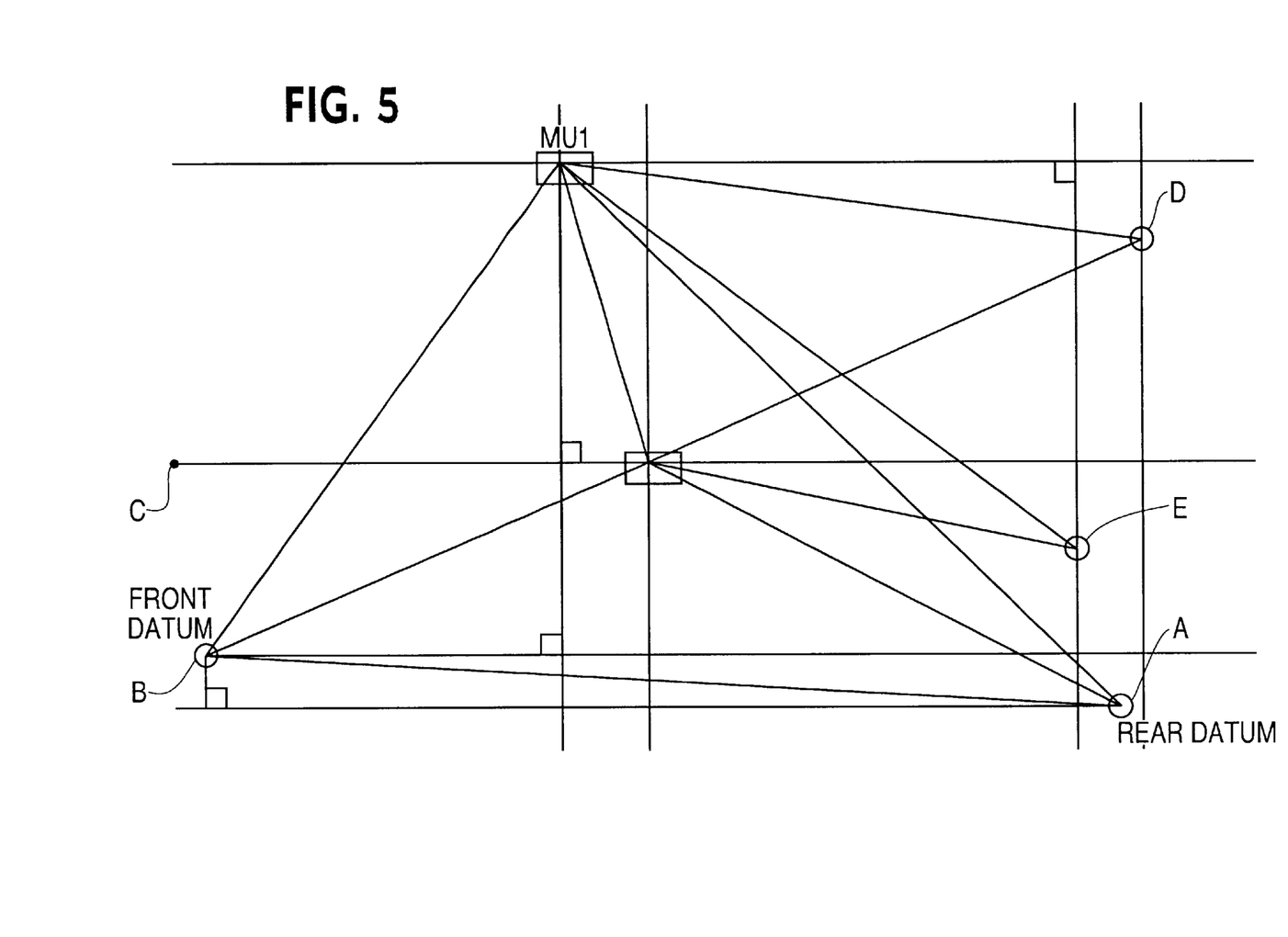
FIG. 5 is a diagram showing geometrical measurements used to determine the position of a part of a vehicle.
Figure 6:
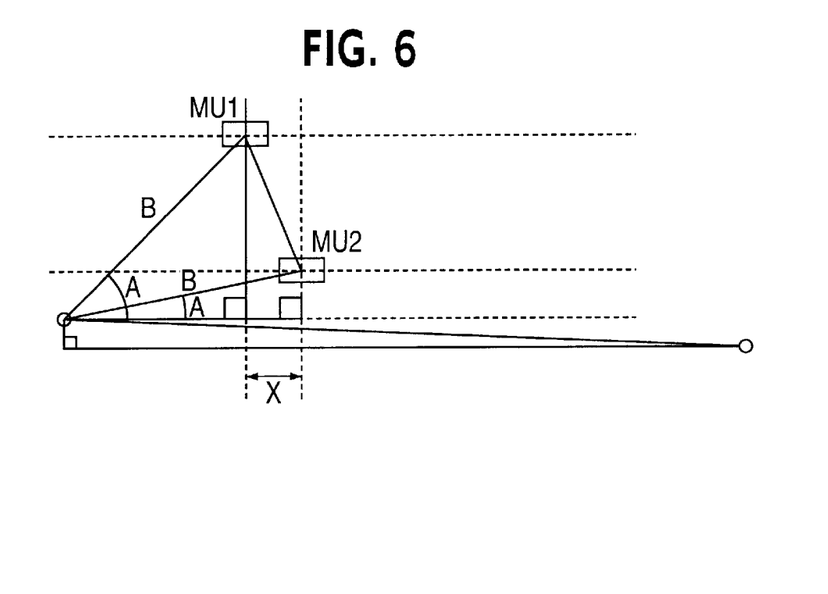
FIG. 6 is a diagram showing optional additional geometrical measurements which can be used with the measurements of FIG. 5.
Figure 7:
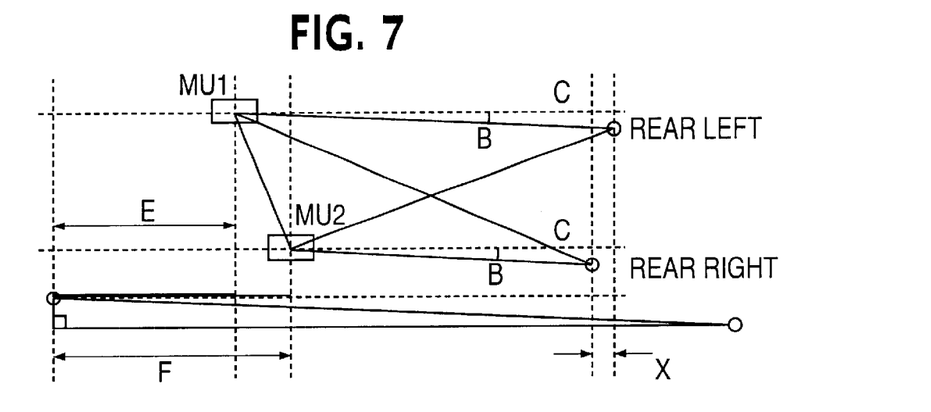
FIG. 7 is a diagram showing further optional geometrical measurements which can be used with the measurements of FIG. 5.

For example, the first engine cross member 12 can be checked for perpendicularity to the datum line. This is achieved by calculating the distance X shown in FIG. 5 in that the cross member is deemed to be perpendicular to the datum line if the calculated value of X is zero. Similarly, the rear drive assembly 18 (rear axle) can be checked for perpendicularity to the datum line by measuring distance X shown in FIG. 6. Both the first engine cross member and the rear drive assembly can be checked for lateral alignment relative to a fixed centre-line which is specific to the vehicle. Also the drive shaft can be checked for alignment with the fixed Centre-Line of the vehicle. Various other checks are also possible.

Not only do the calculations enable the computer to indicate to the engineer if a part is out of position and by how much but also, depending on the polarity of the calculated distance X referred to above, in which direction the part must be moved to achieve correct positioning. It may be necessary to remeasure any part which has been adjusted since it may not have been moved correctly.

It can be seen that the present invention provides a simple and inexpensive way of determining the position of parts in a vehicle without requiring the time-consuming use of expensive jigs. The invention may be particularly useful for checking the correct set up of the vehicle and thereby ensuring the alignment of critical components of the drive transmission. The invention may also be adapted to measure and re-align vehicle body parts and drive units which have been subject to crash damage, for example.

Other modifications can be made to the above invention. For example, the measuring unit may not be mounted directly onto the respective part. Rather, a mounting beam may be used which is itself mounted to the part and the measuring unit is mounted onto it at positions MU1, MU2. This allows the distance between the two measuring locations to be accurately known.

Although the above description refers to rear-wheel drive vehicles, the method is applicable for determining the position of parts in other vehicles such as front-wheel drive vehicles. In this case, there may be fewer pick-up points each of may be located on other parts within the vehicle.

Additionally, although FIG. 2 refers to the use of four pick-up points (with point C being used as a check for the other measurements) a greater or fewer number of points could be used depending on the number of parts to be checked. Generally, for each part whose position is to be checked, two pick-up points on the part and a datum line are required.

A single dropper may be used. It may be initially connected to the measuring unit and then manually held at the pick-up point rather than by a nut/thread arrangement or by magnets. In this case the dropper may be located in the pick-up point bore by a cone-shaped end-piece. An electronic levelling device or other such device may be used as the checking means instead of the spirit level bullseye. This may be enhanced by signalling electronically to the computer when the measuring rod is vertical.

Furthermore, the measuring means is not restricted to the above described measuring unit. Other units whereby distance measurements are made, for example, by ultrasonic signals or electromagnetic signals can be used.

What is claimed is:

1. A method of determining the relative position of a part on a vehicle, said method comprising the steps of:

measuring the distance from a first measuring location on the vehicle to each of a plurality of measuring points associated with said part;

measuring the distance from a second measuring location on the vehicle to each or said measuring points;

calculating the position of each of said measuring points relative to a fixed location on the vehicle, wherein said calculating step comprises calculating the position of a datum line relative to which the position of the part is to be determined;

comparing the position of each of said measuring points relative to said fixed location so as to determine the position of the part on said vehicle; and calculating the position of the intersection between the datum line and a line joining a respective measuring point and the datum line, said joining line being perpendicular to said datum line.

2. The method of claim 1 wherein said comparing step comprises the positional distance along the datum line of the intersections with the datum line of two or more lines extending between the datum line and measuring points associated with a common part.

3. The method of claim 2, wherein said comparing step comprises determining whether said positional distances are substantially equal and using that determination to further determine whether the part is perpendicular to said datum line.

4. The method of claim 1, wherein said datum line is defined by two of said measuring points.

5. The method of claim 1, wherein said calculating step of measuring point position comprises calculating angles between the notional geometrical lines joining said first and second measuring locations.

6. The method of claim 4, wherein said calculating step comprises calculating the angles between the notional geometrical lines joining said first and second measuring location to each of said measuring points.

7. An apparatus for locating the relative position of a part on a vehicle, said apparatus comprising:

a main body having an attachment mechanism at one end thereof operable to attach said body to said vehicle;

an elongate member extending substantially from said main body and universally pivotably mounted to pivot relative to said main body about a pivot point at a central point of the attachment mechanism;

a fixing device operable to releasably fix the position of the elongate member relative to the main body; and a measuring position located at a predetermined position along the elongate member, wherein the apparatus is arranged such that, in use, the measuring position lies vertically below said central point.

8. The apparatus of claim 7, wherein said elongate member is pivotably mounted by a wire attached at one end to the member and at the other end to said central point.

9. The apparatus of claim 8, wherein said attachment mechanism comprises a thread configured for insertion into an aperture on said vehicle, and a nut for securing said thread in said aperture.

10. The apparatus of claim 8, wherein said attachment mechanism comprises a magnet for clamping said body to said vehicle.

11. The apparatus of claim 7, wherein said measuring position comprises a groove in said elongate member for engagement with a part of an associated measuring unit.

12. The apparatus of claim 7, said elongate member further comprising a checking device mounted thereto for checking verticality thereof.

13. The apparatus of claim 12, wherein said checking device comprises a level mounted for axial rotation about said elongate member.

14. The apparatus of claim 13, wherein said checking device comprises an electronic level device mounted for axial rotation about said elongate member.

15. The apparatus of claim 7, wherein said attachment mechanism comprises a thread configured for insertion into an aperture on said vehicle, and a nut for securing said thread in said aperture.

16. The apparatus of claim 7, wherein said attachment mechanism comprises a magnet for clamping said body to said vehicle.

17. An apparatus for locating the relative position of a part on a vehicle, said apparatus comprising:

a device operable to define each of a plurality of measuring points associated with said part;

a measuring device operable for measuring the distance from first and second measuring locations on said vehicle to each of said measuring points;

a calculator for calculating the position of each of said measuring points relative to a fixed location on the vehicle; and a device configured to compare the position of each of said measuring points relative to said fixed locations so as to determine the position of said part on said vehicle.

* * * * *